United States Patent [19]

Bringman et al.

[11] 4,176,001
[45] Nov. 27, 1979

[54] STOCKING MENDING APPARATUS

[76] Inventors: Bernard B. Bringman; Genevieve M. Goodwin, both of 1111 N. 8th St., Boise, Id. 83702

[21] Appl. No.: 940,983

[22] Filed: Sep. 11, 1978

[51] Int. Cl.$^2$ .................... B32B 31/00; B30B 15/34
[52] U.S. Cl. ............................. 156/581; 156/583.9
[58] Field of Search .......................... 156/581, 583

[56] References Cited

U.S. PATENT DOCUMENTS

| 3,387,333 | 6/1968 | Irvine | 156/583 |
| 3,434,910 | 3/1969 | Kannegiesser | 156/583 |
| 3,567,560 | 3/1971 | Stiff | 156/583 |

*Primary Examiner*—Douglas J. Drummond
*Attorney, Agent, or Firm*—Paul F. Horton

[57] ABSTRACT

Stocking mending apparatus including a base portion; a stocking form upstandingly centered on the base portion having an ovoid head portion over which the toe or heel of a stocking may be stretched; a housing cover hingably engaging the base portion, the cover including a heat conducting recessed cap operable to mate with the ovoid head; and means for heating the recessed cap. In use, a pre-molded ovoid-shaped fabric cap having an undersurface including heat bonding adhesive is placed over the stretched toe or heel of the stocking on the ovoid head portion of the stocking form. The hinged cover is then lowered onto the stocking form with the heat conductive recessed cap of the cover compressing the fabric cap. Heat applied to the recessed cap and thereby to the fabric cap causes the fabric cap to be bound with the fabric of the stocking thereby mending the stocking. The apparatus may also include a heat-on off indicator and temperature control.

10 Claims, 4 Drawing Figures

STOCKING MENDING APPARATUS

BACKGROUND OF THE INVENTION

1. Field of the Invention

This invention relates in general to devices for bonding one fabric to another and in particular to devices for mending stockings.

2. Description of the Prior Art

The problems associated with mending stockings are well known. Most often, holes develop in the heels and toes of the stocking where abrasion between the foot and the shoe is greatest. Until now, mending of these areas has been accomplished by sewing or darning the stocking which, at best, is quite time consuming. As a result and because of the inefficiency of the current process, many stockings are not mended and are therefore discarded. Because of the many patterns and colors of stockings, the matching stocking mate is also, of necessity, discarded, resulting in an enormous and needless cost to the consumer. Because of the curved shape of the heel and toe of the stocking, heat bonding iron-on patches, conventionally planar, are not usable.

SUMMARY OF THE INVENTION

The present invention comprises, generally, stocking mending apparatus including a stocking form, having an ovoid head portion, vertically upstanding on a housing base; and a housing cover having a heated recess portion, mateable with the ovoid head to heat-bond a ovoid fabric cap to a heel or toe of a stocking placed over the form. A more complete description of the apparatus and process may be found in the claims.

It is therefore a general object of the present invention to provide apparatus to mend stockings by heat-bonding one fabric to another.

It is also a general object of the present invention to provide apparatus to mend heels and toes of stockings in a quick, efficient manner.

More specifically, it is an object of the present invention to provide a stocking form having the general configuration of the toes and heels of stockings and a heating iron of a mating configuration to heat-bond a fabric cap to a stocking placed over the form.

It is further an object of the present invention to provide apparatus for heat-bonding a fabric cap to a stocking by providing even controlled heat to the surface of the cap.

DETAILED DESCRIPTION OF THE INVENTION

Figure 1:
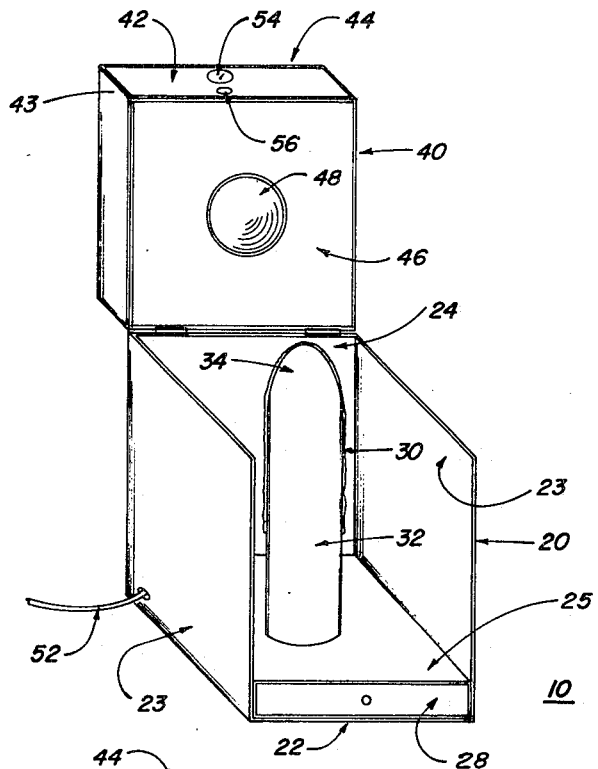
FIG. 1 is a perspective view of the stocking mending apparatus of the present invention with the cover in an open position.
Figure 2:
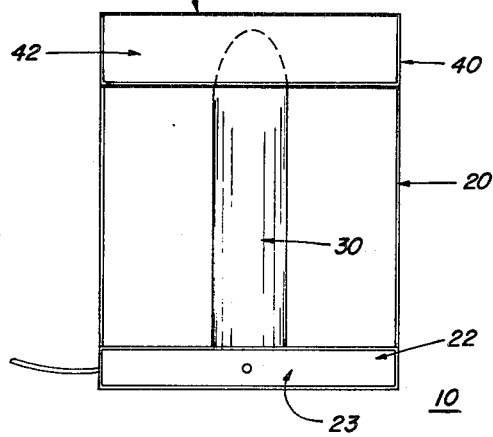
FIG. 2 is a front elevational view of the apparatus showing the cover in a closed position.

Referring now to the drawings, an embodiment to be preferred of a stocking mending device 10, made according to the present invention is disclosed. Mending device 10 includes a base portion 20, a stocking form 30, a housing cover 40, and heating means 50.

Base 20 may include a drawer enclosure portion and a protective wall portion. The drawer enclosure portion includes a bottom wall 22, a pair of side walls 23, a back wall 24, and a stocking form supporting top wall or base plate 25 vertically spaced above and parallel with bottom wall 22 to define an enclosure having a front opening into which a drawer 28 is placed. Drawer 28 is placed for the convenient holding of stockings to be mended or fabric caps 60, as will hereinafter be explained. The protective wall portion includes an upward extension of sidewalls 23 and back wall 24 to define a an enclosure spaced from stocking form 50. The walls of the enclosure provide a mating surface for the housing cover and prevent accidental contact with the stocking form which may be hot. All walls and the drawer may be made of any suitable material with a heat resistant high-impact plastic being preferred.

Vertically mounted on base plate 25 is stocking form 30 which includes two, preferably integral, portions, a pillar portion 32 and an ovoid head portion 34. The pillar portion may be cylindrical in form and of any suitable size to hold the leg of a stocking. The head portion may be made of any suitable heat resistant material and is elliptical or semi-spherical in configuration and is adapted to engage the toe or heel section of a stocking. The term ovoid as used in the specification and the claims is understood to include both round and elliptical configurations. Form 30 is mounted substantially in the center of support wall 25 to allow an open space around the stocking holding form for unobstructed use of the form.

Figure 3:
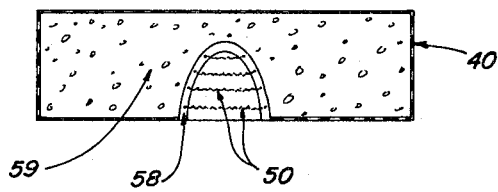
FIG. 3 is a front elevational view of the cover in partial section showing the heating elements and insulation.
Figure 4:
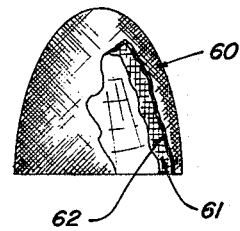
FIG. 4 is a sectional view of the fabric mending cap of the present invention.

Cover 40 is a box-like enclosure having a pair of oppositely disposed side walls 43, a pair of oppositely disposed end walls 42, a top wall 44 and a bottom wall 46. The walls of cover 40 are preferably made of a high impact heat resistant plastic. The cover may be hingably attached on its back end wall 42 to back wall 24, as shown to advantage in FIG. 1, so that the cover may be conveniently raised or lowered to mate with side walls 23 and back wall 24 of the base. Recessed into bottom wall 46 of cover 40 is an ovoid shaped recessed cap 48 operable to snugly mate with head portion 34 of stocking form 30 when cover 40 is lowered onto the stocking form. Recessed cap 48 may be made of any heat conductive material, as for example aluminum or stainless steel. On the interior of the enclosure defined by cover 40, and surrounding cap 48 in close proximity are one or more electric heating elements 50, as shown in FIG. 3. Heating elements 50 may be conventional heating coils, electrically coupled to a power source, not shown, by means of power cord 52. A conventional thermostat 54 may be provided to select a particular temperature. Light 56 serves as an indicator of current flow. Spaced from coils 50 in the cover enclosure is insulation 59 to keep the top and side portions of the cover cool to the touch. A layer of asbestos 58 may be provided to surround the heating coils to prevent contact between the coils and the insulation. The cover may include several apertures, not shown, on the bottom wall for heat ventilation.

In operation, the unit is plugged into an electrical wall recepticle, and thermostat 54 set to a selected temperature depending upon the composition of the stocking material to be mended. With cover 40 in a raised position, a stocking is placed over form 30 with the leg of the stocking surrounding the pillar portion 32 and with the heel or toe to be mended stretched over head portion 34. A fabric cap 60, ovoid in shape, or a particular section of the cap is placed over the hole to be mended, engaging the fabric of the stocking about the perimeter of the hole. Fabric cap 60 may be made of any suitable material 61, preferably matching in texture, composition, and color the stocking to be mended. The underside or concave surface of fabric cap 60 is lined with a heat bonding adhesive 62, as for example, a thermoplastic film, now conventional in the art. Once fabric cap 60 is in place, cover 40 is lowered to bring recessed heat conductive cap 48 into mating relationship with head portion 34 of form 30. Fabric cap 60 is then heated until adhesive 62 binds with the stocking fabric thereby mending the stocking. The cover is then lifted and the mended stocking removed from the form.

Having thus described in detail a preferred embodiment of the present invention, it is to be appreciated and will be apparent to those skilled in the art that many physical changes could be made in the apparatus without altering the inventive concepts and principles embodied therein. The present embodiment is therefore to be considered in all respects as illustrative and not restrictive, the scope of the invention being indicated by the appended claims rather than by the foregoing description, and all changes which come within the meaning and range of equivalency of the claims are therefore to be embraced therein.

We claim

1. Stocking mending apparatus comprising
   a base including an enclosure;
   a vertically upstanding stocking form, having a substantially ovoid head portion, supported on said enclosure;
   a housing cover engageable with said base, said cover including on its under surface a recessed heat conducting cap operable to matingly receive the head portion of said stocking form; and means for heating said cap.

2. The apparatus as described in claim 1 wherein said base comprises a drawer portion and a protective wall portion; said drawer portion including a horizontally oriented, stocking-form supporting base plate, downwardly depending side and back walls and a bottom wall whereby an enclosure having a front opening is defined and a drawer operable to be slidingly inserted through the front opening; and said protective wall portion including a pair of sidewalls and a backwall vertically extending adjacent the periphery of the base plate to define a closure partially surrounding said stocking form.

3. The apparatus as described in claim 2 wherein said housing cover hingably engages the backwall of the protective wall portion of said base.

4. The apparatus as described in claim 1 wherein said housing cover includes a horizontally oriented top wall, a vertically spaced bottom wall and side walls connecting the top and bottom walls to define an enclosure, said recessed cap centered in the bottom wall and separated from top and side walls by insulative material.

5. The apparatus as described in claim 1 wherein said heating means comprises one or more electric heating coils juxtapositioned about said recessed cap and means for connecting the coils to an electrical power source.

6. The apparatus as described in claim 5 further comprising
   means for controlling the temperature of said heating coils and means for visually indicating current flow in the coils.

7. The apparatus as described in claim 1 further comprising a fabric cap, elliptical shaped in cross section, and adapted to engage said recessed cap and having an inner surface including a heat bonding adhesive adapted to bond said cap to a stocking.

8. Stocking mending apparatus comprising
   a base provided with a drawer portion and a protective wall portion, said drawer portion including a horizontally oriented stocking-form supporting base plate, downwardly depending side and back walls and a bottom wall whereby an enclosure having a front opening is defined and a drawer operable to be slidingly inserted through the front opening and said protective wall portion including a pair of sidewalls and a backwall extending vertically adjacent the periphery of the base plate to define a closure having a top and front opening partially surrounding a stocking form.
   a vertically upstanding stocking form mounted on said base, said form having a substantially ovoid head portion operable to receive a toe or heel of a stocking;
   a housing cover hingably engaging the backwall of the protective wall portion of said base, said cover including a horizontal top wall, a bottom wall vertically spaced below and parallel with the top wall and side walls connecting the top and bottom walls to define an enclosure, said bottom walls including a recessed heat conducting cap operable to receive the head portion of said stocking form; and
   means for heating said cap.

9. The apparatus as described in claim 8 further comprising means for controlling the temperature of said heating means.

10. The apparatus as described in claim 8 further comprising a fabric cap having an upper surface of fabric material and a lower surface of heat bonding adhesive, said fabric cap being elliptical in cross section and adapted to be placed between a stocking placed on said ovoid head portion of said stocking form and the exterior surface of said recessed cap of said housing cover to bond said fabric cap to the stocking.

* * * * *